E. SPEARS.
REMOVABLE WAGON-BRAKE.

No. 187,566. Patented Feb. 20, 1877.

Witnesses.
A. Ruppert
D. P. Cowl

E. Spears
Inventor.
D. P. Holloway & Co.
Attys.

UNITED STATES PATENT OFFICE.

EMANUEL SPEARS, OF LA FAYETTE, INDIANA.

IMPROVEMENT IN REMOVABLE WAGON-BRAKES.

Specification forming part of Letters Patent No. 187,566, dated February 20, 1877; application filed October 27, 1876.

*To all whom it may concern:*

Be it known that I, EMANUEL SPEARS, of La Fayette, in the county of Tippecanoe, in the State of Indiana, have invented a new and useful Improvement in Wagon-Brakes, of which the following is a specification:

The object of this invention is to attach a wagon-brake to the bed of a wagon by means of sockets attached to the bed by bolts, and a stem or standard permanently attached to the brake, which may be secured in the sockets by means of a key, so as to permit the ready attachment and detachment of the brake. By this means the brake may be readily transferred from one bed to another, or to a wood or hay ladder.

Figure 1:
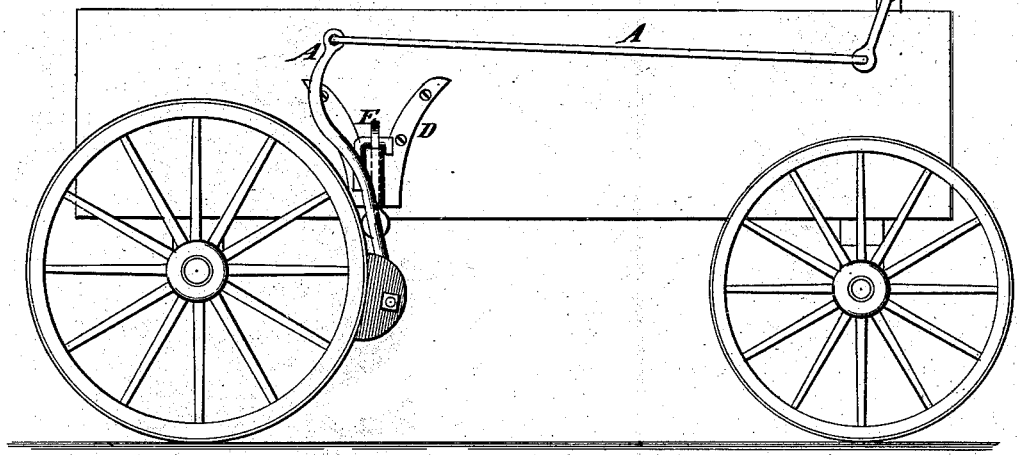
Figure 2:
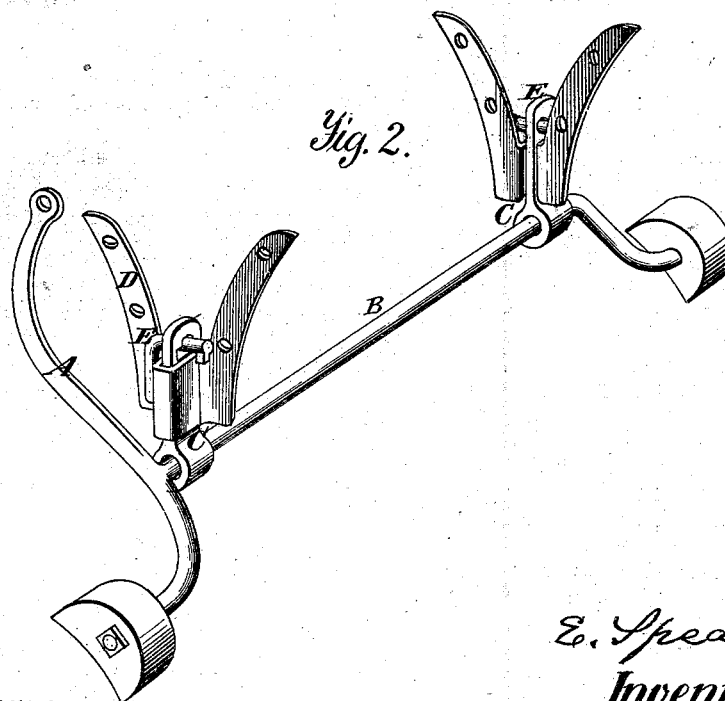

In the annexed drawing, making part of this specification, Figure 1 is an elevation of a wagon having the brake attached to the bed. Fig. 2 is a perspective view of the brake mechanism detached.

A is the lever and operative mechanism of an ordinary wagon-brake, having a transverse rod, B, by which the brake is attached to the wagon. This rod passes through eyes in the stem or standards C, turning freely therein. D is a socket bolted to the bed of the wagon. It is intended that sockets shall be similarly attached to the various beds or racks or ladders intended to be used with the same running-gears. The stem or standards C are inserted in the sockets, and fastened by keys E E, inserted in notched holes in the stems, so that when inserted and turned out of register, they will not fall out.

By this means one set of brake apparatus may be made to serve with whatever is attached to the running-gears.

I do not claim, broadly, for a detachable wagon-brake, but for the mechanism employed for fastening it to either of a series of wagon-beds, so that it shall be secure when attached and, at the same time, easy of removal or attachment.

What I claim as my invention, and desire to secure by Letters Patent, is—

The transferable brake apparatus A B, in combination with the sockets D, and stems or standards C, constructed with notched holes, and keys E, which, when inserted, are held in place by being turned out of register, substantially as set forth.

In testimony whereof I have signed my name to this specification in the presence of two subscribing witnesses.

EMANUEL ×his mark. SPEARS.

Witnesses:
A. ORTH BEHM,
J. S. BERRYHILL.